United States Patent [19]

Braukmann

[11] 4,185,656

[45] Jan. 29, 1980

[54] DUAL CHECK VALVE STRUCTURE

[75] Inventor: Heinz W. Braukmann, Willowdale, Canada

[73] Assignee: Braukmann Armaturen AG, Rothrist, Switzerland

[21] Appl. No.: 860,061

[22] Filed: Dec. 13, 1977

[51] Int. Cl.² ............................................. F16K 15/06
[52] U.S. Cl. ................................ 137/512.3; 137/540; 137/542
[58] Field of Search ................... 137/512, 512.2, 512.3, 137/513, 540, 542

[56] References Cited

U.S. PATENT DOCUMENTS

| | | | |
|---|---|---|---|
| 1,457,574 | 6/1923 | Hinds | 137/513 |
| 1,507,448 | 9/1924 | Aldrich | 137/512 |
| 1,808,074 | 6/1931 | Rike et al. | 137/513 |
| 2,500,156 | 3/1950 | Dechant | 137/512.3 |
| 2,621,017 | 12/1952 | Yohpe | 137/512 X |
| 3,022,797 | 2/1962 | Allin | 137/454.5 X |

Primary Examiner—William R. Cline
Attorney, Agent, or Firm—William T. Howell

[57] ABSTRACT

A first and second check valve operated independently in a conduit section and having first and second valve stems on a common axis with first and second valve seats and cooperating normally disposed valve plates with the valve stems inclined away from the direction of flow, the second valve seat being larger than the first valve seat and the lowermost level of the second valve seat is at least below the lowermost level of the lift of the first valve plate with a single removable cover on the conduit section for securing the check valve in position.

7 Claims, 4 Drawing Figures

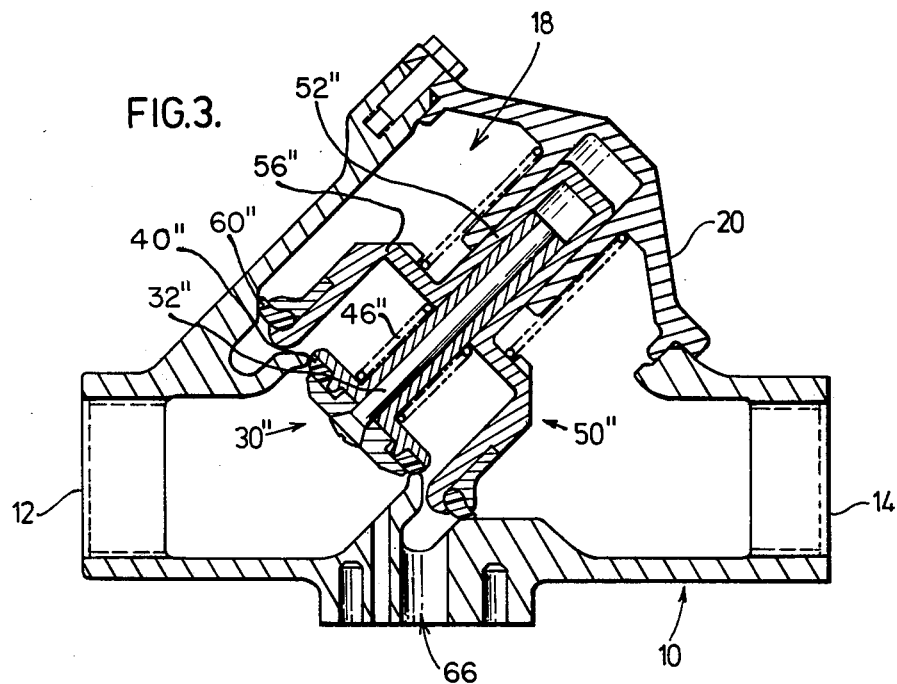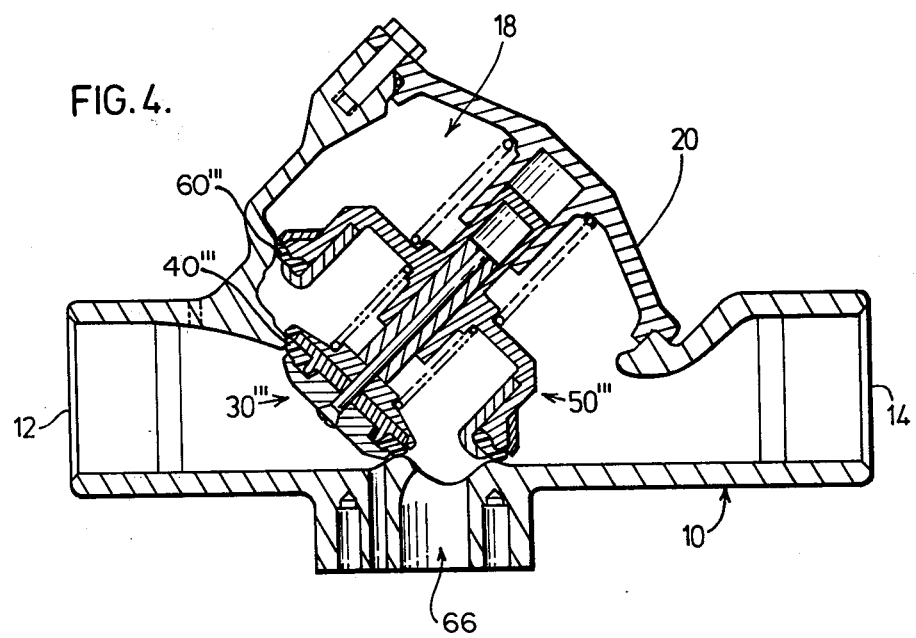

DUAL CHECK VALVE STRUCTURE

FIELD OF INVENTION

This invention relates to double check valve structures for the control of fluids, and although not limited thereto, has particular relation to double check valve structures used in back flow preventers for drinking water flowing in a conduit.

PRIOR ART

Any arrangement of double check valves in a conduit must provide for securement and access for servicing. In a known valve arrangement involving the use of first and second check valves positioned in a straight length of conduit, the valve stem of each check valve necessarily in line with the other to provide a compact assembly, and is also positioned normally with respect to the longitudinal axis of the conduit which corresponds with the direction of flow. It follows that when the check valves open to provide for passage of the fluid in a straight line conduit, the direction of the fluid is necessarily changed upwards in the region occupied by the check valves. As a result there is increased resistance to the flow which requires higher expenditure of energy by the pump to maintain the pressure than is the case if the check valves were absent. Furthermore, it is well known that the higher the resistance coefficient of the system, the greater is the pressure fluctuation during operation of the valve structure.

The smaller the diameter of the conduit, the greater the difficulties of providing a double check valve structure of the type described above because efficient operation of the check valves requires use of the factor that the first valve plate lift should preferably be around 25% of the valve plate diameter. Hence, as the conduit diameter decreases, the valve plate diameter has to decrease to provide the requisite factor; due to reduction in size the problems of manufacturing the check valves are increased.

SUMMARY OF THE INVENTION

It is an object of the invention to provide a double check valve structure in a straight line conduit section wherein upward flow through the check valves is substantially limited and instead the flow therethrough is generally in line with the flow prior to entry into the first check valve. This is achieved by providing that the common axis of the in-line valve stems is inclined away from the direction of flow along the conduit, that the second check valve seat is larger than the first check valve seat and that the valve plates, normally disposed to the respective stems, are located in the conduit so that the lowermost level of the second check valve plate is at least below the lowermost level of the lift of the first check valve plate. Removable means are provided on the conduit to secure the check valves in the requisite position and preferably the seats are integral in a removable sleeve located in the conduit.

In a further embodiment the check valve seats are substantially in the same plane perpendicular to the common axis of the valve stems.

BRIEF DESCRIPTION OF THE DRAWINGS

The invention will now be described in relation to the accompanying drawings, in which:

FIG. 3 is a cross sectional view of the embodiment shown in FIG. 1 but with the first and second valve seats in the same plane with respect to the common axis of the valve stems.

FIG. 4 is a cross sectional view of the embodiment shown in FIG. 1 but with the first and second valve seats substantially parallel to the direction of flow of the fluid in the conduit section.

DESCRIPTION OF PREFERRED EMBODIMENTS

In the description like numbers represent like parts.

Figure 1:
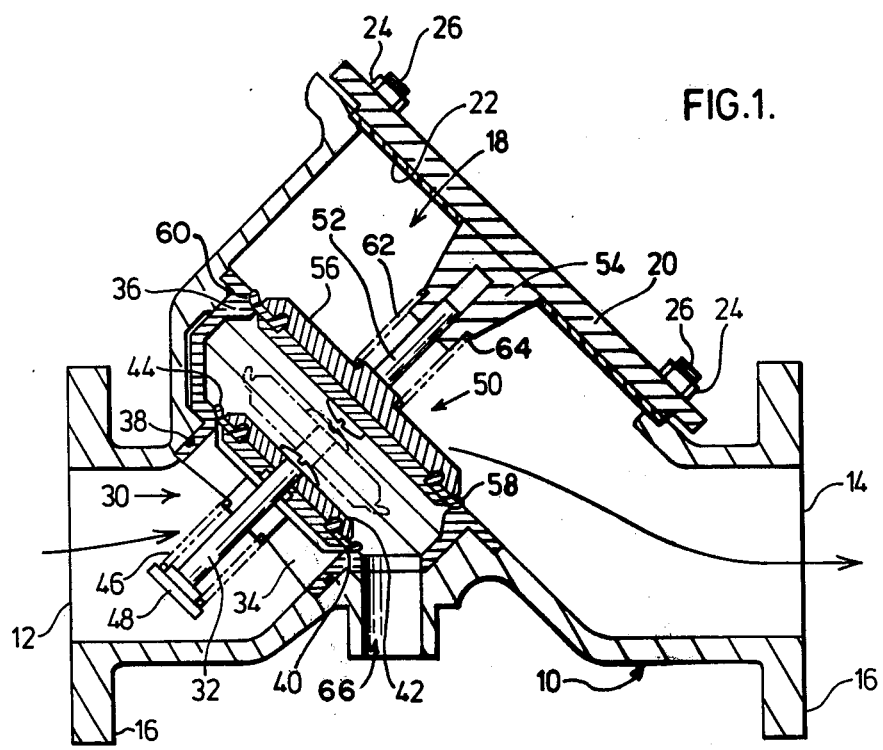
FIG. 1 is a cross sectional view of a first embodiment of valve constructed according to the invention with the lowermost level of the inclined second valve plate below the lowermost level of the lift of the first plate shown in broken line.

With reference to FIG. 1 the valve of the invention is positioned in a conduit section denoted by the numeral 10 and having an inlet 12 and an outlet 14 which are in line. The section 10 may be provided with flanges 16 for connection to the conduit, not shown.

The conduit section 10 has an upper opening 18 closed by removable cover plate 20 having a gasket 22 and secured in position by nuts 24 threaded on to bolts 26 fixed in the wall of the section 10 at the edge of the openings 18.

Conduit section 10 contains a first check valve, generally denoted by numeral 30, located adjacent the inlet 12. Check valve 30 has a valve stem 32 inclined away from the direction of flow of the inlet 12. The valve stem 32 is slidably mounted in the cross arm 34 of a removable sleeve 36 located in the conduit 10 and sealed thereto by seal 38. Sleeve 36 is shaped to provide a valve seat 40. The valve stem 32 carries a normally disposed plate 42 having a resilient insert 44 which seals with the valve seat 40 due to the action of a valve spring 46 bearing against the stepped end 48 of the valve stem 32; the other end of the spring 46 bears against the cross arm 34. The strength of the spring 46 is selected to allow a predetermined lift of the valve plate 42 due to the pressure exerted by the flow and the extent of this lift is depicted in broken line in FIG. 1.

The conduit section 10 also contains a second check valve, generally denoted by the numeral 50, which includes a valve stem 52 in line with the inclined valve stem 32 of the first check valve 40 already described. The upper end of the valve stem 52 is removably located in a hollow neck 54 extending from the inside of the cover plate 20 of the conduit 10. The lower end of the valve stem 32 is secured to a normally disposed valve plate 56, the lower edge of which has a resilient insert 58 which seals with the valve seat 60 due to the action of a spring 62 bearing against a neck 64 and valve plate 56. The seat 60 is provided in the removable sleeve 36 in the same manner as seat 40, but seat 60 is larger in diameter than seat 40 as illustrated in FIG. 1.

The arrangement is such that due to the inclination of the valve stems 32 and 52, seat 60 being larger than seat 40 and the lift of the valve plate 42 as illustrated in broken line, it will be seen that the flow through the check valves 30 and 50 is substantially in a straight line as indicated by the arrows. This results from the first and second valve seats 40, 60 being positioned with portions between the inlet 12 and outlet 14, and from first valve plate 42 lifting sufficiently relative to the second valve seat 60.

The valve structure described above is serviced by removing the cover plate 20 and then withdrawing the check valves 30 and 50 together with sleeve 36.

Figure 2:
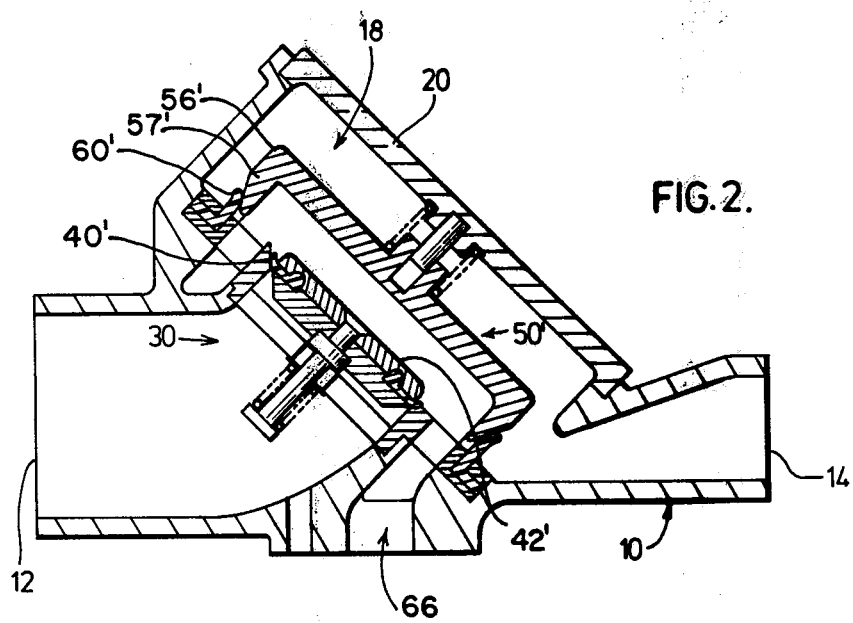
FIG. 2 is a cross sectional view of the embodiment shown in FIG. 1 but with the lowermost level of the second valve plate below the lowermost level of the first valve plate.

With reference to FIG. 2 it will be observed that the lowermost level of valve seat 60' is below the lowermost level of the valve seat 40' and hence well below the lowermost level of the lift of the valve plate 42'. To provide for the preferred lift of the latter, the second valve plate 56' may be domed as illustrated so as to have a depending annular wall 57' engaging the valve seat 60'.

In the embodiment shown in FIG. 3 the valve stem 32" of the first check valve 30" is slidably located in the valve stem 52" of the second check valve 50"; also the upper end of the first check valve spring 46" bears against the underside of the second check valve plate 56" which is domed to provide the necessary space for the spring. In this embodiment the first check valve seat 40" and the second check valve seat 60" are in substantially the same plane with respect to the common axis of the valve stems 32" and 52".

In the embodiment shown in FIG. 4 the lowermost level of the first check valve seat 40" and of the second check valve seat 60" are located in the same plane with respect to the direction of flow, being substantially parallel thereto.

The double check valve structure, shown in each of the figures, has a vent 66 which enables the structure to operate as a back flow preventer in the event that the second check valve does not close soon enough or completely on reversal of the flow. However, without the vent 66, and if the flow ceases or there is a reversal of pressure in the conduit section 10, both first and second check valves would close tightly to prevent contamination; also as a further protection they are operated independently so that if one of them ceases to function properly the other will check the reverse flow.

Where the valve structure is arranged as in FIG. 3 it will be appreciated that on removal of the cover plate 20, both first and second check valve plates and stems can be removed without provision of a removable sleeve 36. However, the latter has particular utility because it enables the check valve structure to be inserted or removed as a unit for the purposes of servicing.

I claim:

1. A check valve assembly including a conduit body having an inlet and an outlet on a longitudinal axis thereof and first and second check valves in said conduit body, said check valves respectively having first and second valve stems moveable along a common axis inclined to said longitudinal axis, in the direction of flow, first and second annular valve seats to said conduit body and co-operating valve plates normally disposed to said common axis and mounted on said valve stems, said check valves having individual spring means surrounding said first and second valve stems, engageable with said conduit body, and acting on said valve plates to move them opposite to the direction of flow to engage their respective valve seats and terminate flow from said inlet to said outlet when there is sufficient drop in pressure of the flow in said conduit body, said first check valve being upstream of said second check valve and said second annular valve seat having a larger diameter than said first valve seat, said first valve plate having a lift along its common axis with the lift of said second valve plate sufficient to enable fluid flowing from the inlet to the outlet, when the check valves are open, to flow over the lower perimeter of each of said annular valve seats in a substantially straight line from the inlet to the outlet and said conduit body having removable means for securing said check valves in position.

2. A check valve assembly according to claim 1 wherein said second valve plate has a depending annular wall engageable with said second valve seat, and said first valve plate is positioned to move to an open position within the area bounded by said annular wall.

3. A check valve assembly according to claim 1 wherein said first valve stem is slidably mounted in said second valve plate.

4. A check valve assembly according to claim 1 wherein said first and second valve seats lie in first and second planes respectively, and said second valve seat lies in a plane downstream of said first valve seat.

5. A check valve assembly according to claim 1 wherein said first valve stem is slidably mounted in said second valve plate, said second valve plate has a depending annular wall engageable with said second valve seat, and said first valve plate is positioned to move to an open position within the area bounded by said annular wall.

6. A check valve assembly according to claim 5 wherein said first and second valve seats lie in first and second planes respectively, and said second valve seat lies in a plane downstream of said first valve seat.

7. A check valve assembly according to claim 1 including a removable sleeve in said conduit section, said first and second valve seats being located on said removable sleeve.

* * * * *